(12) United States Patent
Gould et al.

(10) Patent No.: US 7,411,418 B2
(45) Date of Patent: Aug. 12, 2008

(54) EFFICIENT REPRESENTATION OF STATE TRANSITION TABLES

(75) Inventors: Stephen Gould, Queens Park (AU); Robert Matthew Barrie, Double Bay (AU); Michael Flanagan, Newtown (AU); Darren Williams, Newtown (AU)

(73) Assignee: Sensory Networks, Inc., East Sydney, NSW (AU)

( * ) Notice: Subject to any disclaimer, the term of this patent is extended or adjusted under 35 U.S.C. 154(b) by 747 days.

(21) Appl. No.: 10/850,979

(22) Filed: May 21, 2004

(65) Prior Publication Data

US 2005/0028114 A1    Feb. 3, 2005

Related U.S. Application Data

(60) Provisional application No. 60/473,373, filed on May 23, 2003.

(51) Int. Cl.
*G06F 7/38* (2006.01)
*H03K 19/173* (2006.01)

(52) U.S. Cl. .......................................... 326/46; 706/48
(58) Field of Classification Search ................... 326/46; 716/3; 706/48; 714/15, 21; 707/1, 6, 7; 382/187
See application file for complete search history.

(56) References Cited

U.S. PATENT DOCUMENTS

| | | | |
|---|---|---|---|
| 5,151,950 A * | 9/1992 | Hullender | 382/187 |
| 5,564,058 A * | 10/1996 | Kaplan et al. | 707/6 |
| 5,608,662 A | 3/1997 | Large et al. | |
| 6,167,047 A | 12/2000 | Welfeld | |
| 7,240,040 B2 * | 7/2007 | Wyschogrod et al. | 706/48 |
| 2003/0033278 A1 * | 2/2003 | Abe et al. | 707/1 |
| 2003/0051043 A1 | 3/2003 | Wyschogrod et al. | |
| 2003/0065800 A1 | 4/2003 | Wyschogrod et al. | |

* cited by examiner

*Primary Examiner*—Rexford Barnie
*Assistant Examiner*—Crystal L Hammond
(74) *Attorney, Agent, or Firm*—Townsend and Townsend and Crew LLP; Kenneth R. Allen

(57) ABSTRACT

The states associated with a programmable state machine are reordered to compress the storage of transitions which define the state machine. To reorder the states, a score is computed and assigned to each of the states. Next, the states are sorted according to their computed scores. In some embodiments, to compute the score for each current state based on the received input symbol, the number of times that the input symbol causes transition to similar states is added. The sum of the scores in each row of the table is representative of the score for the associated current state associated with that row. The states are sorted according to their score and a new state transition table is generated in accordance with the reordered states.

6 Claims, 11 Drawing Sheets

Mealy Machine

INPUT SYMBOL

| | 0 | 1 | 2 | 3 | 4 | 5 | 6 | 7 | 8 | 9 | @ | "." | "-" | C | O | M |
|---|---|---|---|---|---|---|---|---|---|---|---|---|---|---|---|---|
| 0 | 0 | 1 | 1 | 1 | 1 | 1 | 1 | 1 | 1 | 1 | 0 | 0 | 0 | 0 | 0 | 0 |
| 1 | 1 | 1 | 1 | 1 | 1 | 1 | 1 | 1 | 1 | 1 | 2 | 0 | 0 | 0 | 0 | 0 |
| 2 | 0 | 3 | 3 | 3 | 3 | 3 | 3 | 3 | 3 | 3 | 0 | 0 | 0 | 0 | 0 | 0 |
| 3 | 3 | 3 | 3 | 3 | 3 | 3 | 3 | 3 | 3 | 3 | 2 | 4 | 4 | 0 | 0 | 0 |
| 4 | 0 | 1 | 1 | 1 | 1 | 1 | 1 | 1 | 1 | 1 | 0 | 0 | 0 | 5 | 0 | 0 |
| 5 | 0 | 1 | 1 | 1 | 1 | 1 | 1 | 1 | 1 | 1 | 0 | 0 | 0 | 0 | 6 | 0 |
| 6 | 0 | 1 | 1 | 1 | 1 | 1 | 1 | 1 | 1 | 1 | 0 | 0 | 0 | 0 | 0 | 7 |
| 7 | 7 | 7 | 7 | 7 | 7 | 7 | 7 | 7 | 7 | 7 | 7 | 7 | 7 | 7 | 7 | 7 |

CURRENT STATE (row labels)

FIG. 6A

SCORE

| | 0 | 1 | 2 | 3 | 4 | 5 | 6 | 7 | 8 | 9 | @ | "." | "-" | C | O | M |
|---|---|---|---|---|---|---|---|---|---|---|---|---|---|---|---|---|
| 0 | 5 | 5 + | 5 + | 5 + | 5 + | 5 + | 5 + | 5 + | 5 + | 5 + | 5 + | 6 + | 6 + | 6 + | 6 + | 6 |
| 1 | 1 + | 5 + | 5 + | 5 + | 5 + | 5 + | 5 + | 5 + | 5 + | 5 + | 2 + | 6 + | 6 + | 6 + | 6 + | 6 |
| 2 | 5 + | 2 + | 2 + | 2 + | 2 + | 2 + | 2 + | 2 + | 2 + | 2 + | 5 + | 6 + | 6 + | 6 + | 6 + | 6 |
| 3 | 1 + | 2 + | 2 + | 2 + | 2 + | 2 + | 2 + | 2 + | 2 + | 2 + | 2 + | 1 + | 1 + | 6 + | 6 + | 6 |
| 4 | 5 + | 5 + | 5 + | 5 + | 5 + | 5 + | 5 + | 5 + | 5 + | 5 + | 5 + | 6 + | 6 + | 1 + | 6 + | 6 |
| 5 | 5 + | 5 + | 5 + | 5 + | 5 + | 5 + | 5 + | 5 + | 5 + | 5 + | 5 + | 6 + | 6 + | 6 + | 1 + | 6 |
| 6 | 5 + | 5 + | 5 + | 5 + | 5 + | 5 + | 5 + | 5 + | 5 + | 5 + | 5 + | 6 + | 6 + | 6 + | 6 + | 2 |
| 7 | 1 + | 1 + | 1 + | 1 + | 1 + | 1 + | 1 + | 1 + | 1 + | 1 + | 1 + | 1 + | 1 + | 1 + | 1 + | 2 |

FIG. 6B

| | INPUT SYMBOL | | | | | | | | | | | | | | | |
|---|---|---|---|---|---|---|---|---|---|---|---|---|---|---|---|---|
| | | 0 | 1 | 2 | 3 | 4 | 5 | 6 | 7 | 8 | 9 | @ | "." | "-" | C | O | M |
| CURRENT STATE | 0 | 0 | 4 | 4 | 4 | 4 | 4 | 4 | 4 | 4 | 4 | 0 | 0 | 0 | 0 | 0 | 0 |
| | 1 | 0 | 4 | 4 | 4 | 4 | 4 | 4 | 4 | 4 | 4 | 0 | 0 | 0 | 2 | 0 | 0 |
| | 2 | 0 | 4 | 4 | 4 | 4 | 4 | 4 | 4 | 4 | 4 | 0 | 0 | 0 | 0 | 3 | 0 |
| | 3 | 0 | 4 | 4 | 4 | 4 | 4 | 4 | 4 | 4 | 4 | 0 | 0 | 0 | 0 | 0 | 7 |
| | 4 | 4 | 4 | 4 | 4 | 4 | 4 | 4 | 4 | 4 | 4 | 5 | 0 | 0 | 0 | 0 | 0 |
| | 5 | 0 | 6 | 6 | 6 | 6 | 6 | 6 | 6 | 6 | 6 | 0 | 0 | 0 | 0 | 0 | 0 |
| | 6 | 6 | 6 | 6 | 6 | 6 | 6 | 6 | 6 | 6 | 6 | 5 | 1 | 1 | 0 | 0 | 0 |
| | 7 | 7 | 7 | 7 | 7 | 7 | 7 | 7 | 7 | 7 | 7 | 7 | 7 | 7 | 7 | 7 | 7 |

510

EFFICIENT REPRESENTATION OF STATE TRANSITION TABLES

CROSS-REFERENCES TO RELATED APPLICATIONS

The present application claims benefit under 35 USC 119 (e) of the filing date of U.S. provisional application No. 60/473,373, filed on May 23, 2003, entitled "Apparatus And Method For Large Hardware Finite State Machine With Embedded Equivalence Classes", the content of which is incorporated herein by reference in its entirety.

The present application is related to co-pending U.S. application Ser. No. 10/850,978, entitled "Apparatus And Method For Large Hardware Finite State Machine With Embedded Equivalence Classes", filed contemporaneously herewith, assigned to the same assignee, and incorporated herein by reference in its entirety.

FIELD OF THE INVENTION

The present invention relates to integrated circuits, and more particularly to programmable finite state machines with high throughput.

BACKGROUND OF THE INVENTION

Deep content inspection of network packets is driven, in large part, by the need for high performance quality-of-service (QoS) and signature-based security systems. Typically QoS systems are configured to implement intelligent management and deliver content-based services which, in turn, involve high-speed inspection of packet payloads. Likewise, signature-based security services, such as intrusion detection, virus scanning, content identification, network surveillance, spam filtering, etc., involve high-speed pattern matching on network data.

The signature databases used by these services are updated on a regular basis, such as when new viruses are found, or when operating system vulnerabilities are detected. This means that the device performing the pattern matching must be programmable.

As network speeds increase, QoS and signature-based security services are finding it increasingly more challenging to keep up with the demands of the matching packet content. The services therefore sacrifice content delivery or network security by being required to miss packets. Currently, fast programmable pattern matching machines are implemented using finite state machines (FSM).

FIGS. 1A and 1B respectively show state transition diagrams 100 and state transition tables 110 of a finite state machine (FSM) adapted to perform the following Regular Expression:

$$.*[1\text{-}9][0\text{-}9]*@[1\text{-}9][0\text{-}9]*(.|\text{-})COM.* \qquad (1)$$

For purposes of simplicity, it is assumed that only the sixteen symbols used in expression (1) are defined. It is understood that expression (1) may include a string containing any of the digits 1-9, followed by zero or more of any of the digits 0-9, followed by the "@" symbol; followed by any of the digits 1-9, followed by zero or more of any of the digits 0-9; followed by either a single period (.) or hyphen (-), followed by the letters "COM". Examples of strings that match the expression are shown below:

12345@6789-COM

COM10@89.COM

Examples of strings that do not match the expression are shown below:

123456789

0@0.COM

Many of the state transitions, particularly those that transition back to the start state are omitted from the state transition diagram 100 for simplicity. State transition diagram is a deterministic finite state automata (DFA). Table 110 lists the current state along the rows, and the current input symbols along the columns. Each entry in table 100 defines the state to which transition is made to given the combined current state and current input symbol.

There are two types of FSMs. In a Moore FSM, shown in FIG. 2A, the input symbol and current state are received by a logic block 20 which is configured to generate the next state; this next state is saved in a register 21. Register 21 is clocked every time a new input symbol arrives. The output symbol is generated by an output logic block. The following pseudo-code shows that the output of a Moore FSM is determined by the current state of the FSM:

MOORE_OUTPUT=OUTPUT_TABLE[CURRENT_STATE]

In a Mealy FSM, shown in FIG. 2B, the input symbol and current state are received by logic block 25 which is configured to generate the next state. The next logic state together with the received input symbol define the output symbol. The following pseudo-code shows that the output of a Mealy FSM is determined by the current state of the FSM together with the received input symbol:

MEALY_OUTPUT=OUTPUT_TABLE[CURRENT_STATE][INPUT_SYMBOL]

FIG. 3 is a simplified high-level block diagram of a conventional programmable Moore FSM 35. The transition table for FSM 35 is stored in a transition table memory 30 and is indexed by the current state and input symbol. This memory is clocked after the receipt of each new input symbol. The output is read from an output look-up table memory 31 indexed by the current state. FSM implementation 35 is flexible in that it is programmable and can implement state transitions at relatively high-throughput. However as the number of data related to the states, input symbols and transitions become large, the amount of memory needed to store this data grows exponentially. For an n-bit state vector and k-bit symbol, FSM 35 requires $2^{n+k}$ memory locations for the transition table 30, and $2^n$ memory locations for output look-up table 31.

As is known, the process of mapping a regular expression, such as expression (1) shown above, or signature database, to a FSM involves compiling the expression into a non-deterministic finite-state automaton (NFA), and then converting the NFA to a deterministic finite-state automaton (DFA).

In addition to pattern matching through regular expressions, FSMs also have applications in protocol specification, implementation and validation such as TCP/IP, expert systems and machine learning where knowledge is expressed as decision trees or stored in directed graphs, formal modeling, and image processing.

An FSM typically starts in a given initial state, usually state zero. On receipt of each input symbol, the FSM advances to a new state determined by the current state, together with the input symbol. This operation is referred to as calculating the "next state" or "transition function" of the finite state machine. The calculation of the next state is often performed through a table lookup. The table (see FIG. 1B), known as the "transition table", is arranged so as having the row number determined by the current state and the column number by the current input symbol. Each entry in the transition table contains the value for the next state given that current state, as defined by the row, and the input symbol, as defined by the column. The transition table is commonly stored using a RAM lookup table, as shown in FIG. 3. Data symbols received from a digital network are usually encoded as 8-bit bytes, and the number of states is determined by the complexity of the given application. The following pseudo-code illustrates the FSM operation:

```
CURRENT_STATE = 0
for each INPUT_SYMBOL,
    NEXT_STATE = TRANSITION_TABLE[CURRENT_
    STATE][INPUT_SYMBOL]
    CURRENT_STATE = NEXT_STATE
    next INPUT_SYMBOL
```

Programmable FSMs are often expensive because of the size of the memory required to store the transition table. This problem is even more pronounced for fast FSMs which are required to compute the next state within a few and fixed number of clock cycles. For example, the state machine implementation shown in FIG. 3, having n-bit state vector and k-bit symbols, requires $2^{n+k}$ entries of n-bit words, or $2^{n+k} \times n$ bits, for storing the full transition table. Additional memory is required for the output look-up table. For example, for an application servicing 1 Gbps network traffic, the FSM is required to compute the next state every 8 ns, for 8-bit input symbols.

U.S. Pat. No. 6,167,047 describes a technique in which memory optimization is achieved through usage of stack memory allowing the state machine to repeat common sub-expressions while calculating the next state within a single clock cycle. This technique uses a large memory, and therefore limits the complexity of the FSM. This technique also suffers from the problem that the stack memory is limited.

U.S. Patent application No. 2003/0051043 and U.S. Patent application No. 2003/0065800 describe techniques for performing regular expression pattern matching using parallel execution of real-time deterministic finite state automata (RDFA). The technique involves processing data at higher speeds by combining a number of bytes into an aggregate symbol. This technique involves creation of n-closures which increase the size of the FSM as the number of potential transitions per state increases exponentially.

The prior art methods assign state numbers in an arbitrary manner. Therefore, the transition table may not always be stored efficiently and thus may result in excessive usage of memory resources in high performance hardware.

BRIEF SUMMARY OF THE INVENTION

In accordance with the present invention, the states associated with a programmable finite state machine (FSM), are reordered to compress the transitions that define the FSM. The FSM thus requires a smaller memory while maintaining a high data throughput. The compression is achieved from the redundancy in the state transitions.

To reorder the states, a score is computed and assigned to each of the states. A number of different techniques may be used to compute these scores. Next, the states are sorted according to their computed scores. In one embodiment, the states are sorted according to an ascending order of their computed scores. In another embodiment, the states may be sorted using other sorting algorithms.

In some embodiments, to compute the score for each current state based on the received input symbol, the number of times that the input symbol causes transition to similar states is added to compute that score. For example, if each of the current states 0, 1, 4, 5, and 6, transition to state 1 if they receive symbol 1, a score of 5 is computed and assigned to each of states 0, 1, 4, 5 and 6 for the input symbol 1. The sum of the scores in each row of the table is representative of the score for the current state associated with that row. The states are sorted according to their score and a new state transition table is generated in accordance with the reordered states.

BRIEF DESCRIPTION OF THE DRAWINGS

FIG. 6A shows the state transition table of FIG. 1B.

FIG. 6B shows the score computed for each entry in state transition table of FIG. 6A, in accordance with one embodiment of the present invention.

DETAILED DESCRIPTION OF THE INVENTION

Figure 4:
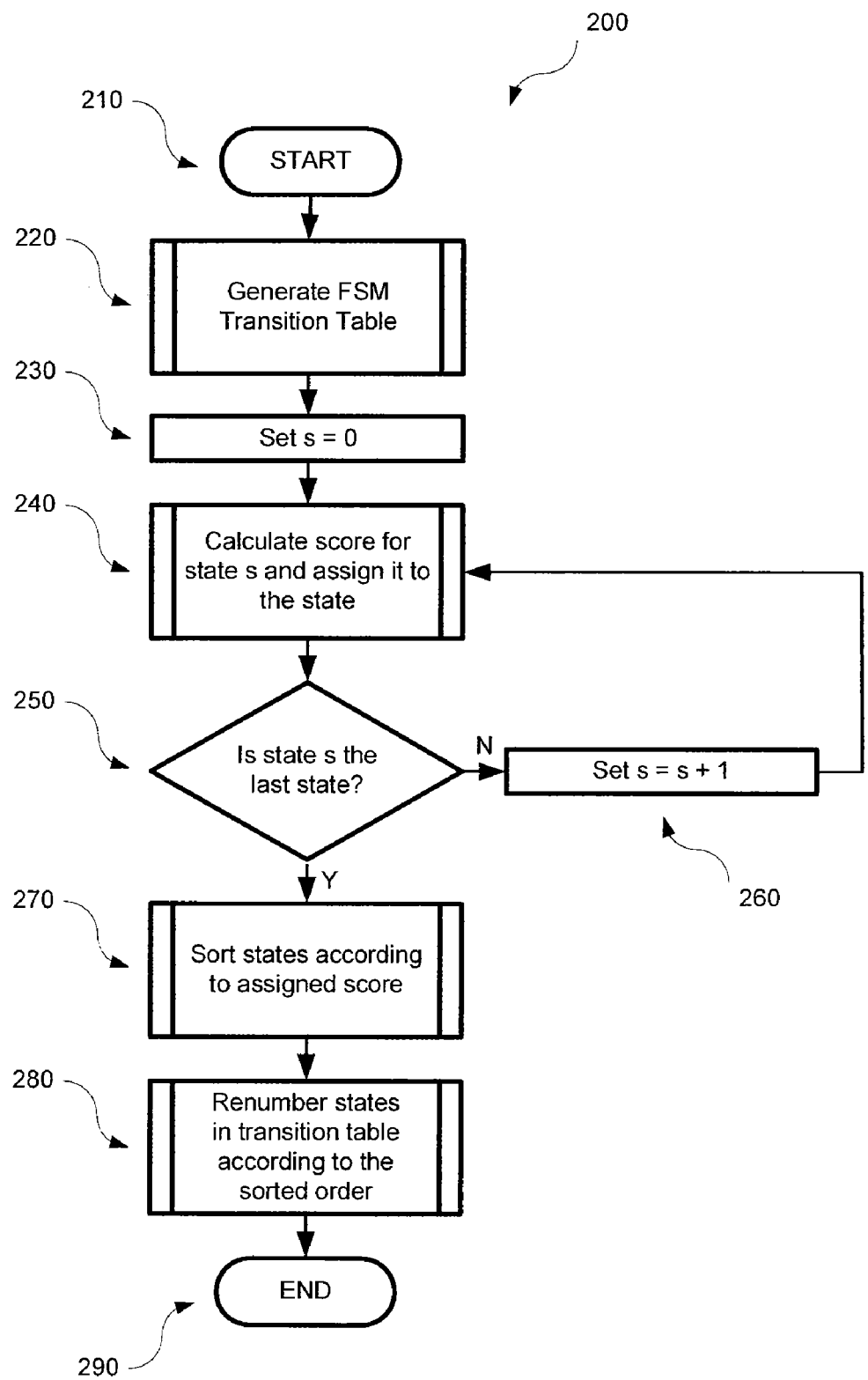
FIG. 4 is a flowchart of steps carried out to reorder states of an FSM, in accordance with one embodiment of the present invention.
Figure 5:
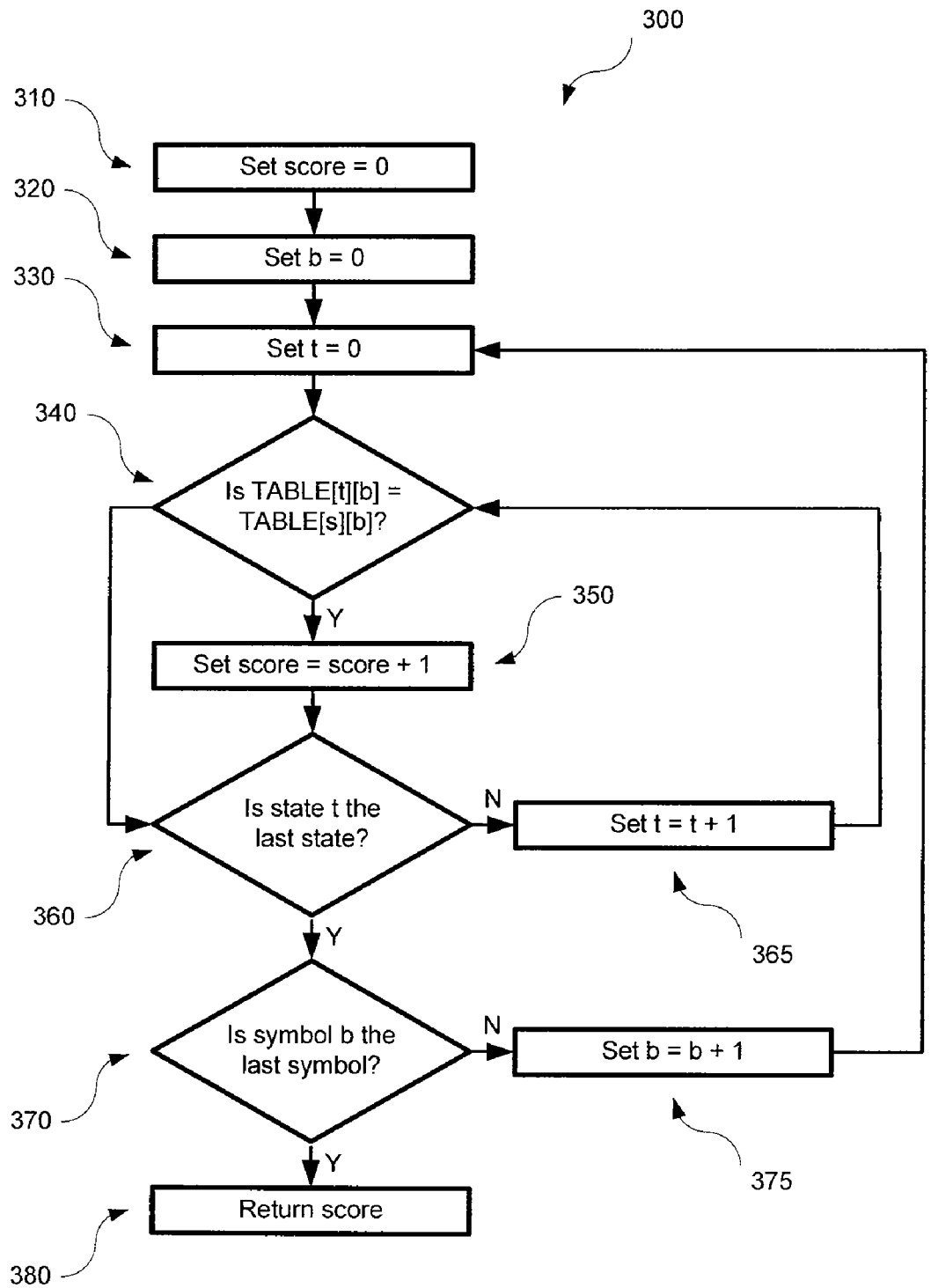
FIG. 5 is a flowchart of steps carried out to compute scores associated with the states of an FSM, in accordance with one embodiment of the present invention.

FIG. 4 is a flowchart 200 of steps carried out to renumber the states of a finite state machine (FSM), in accordance with one embodiment of the present invention. At step 210, the renumbering of state begins. At step 220, the transition table associated with the FSM is generated using one of a number of known techniques. At step 230 a parameter s, which keeps track of the states is initialized to 0. Thereafter, a score is computed and assigned to each of the states as iteration is made through steps 240, 250 and 260, and as is seen from the flowchart 200. A number of different techniques may be used to compute these scores, as is described further below.

In step 270, the states are sorted according to their computed scores. In one embodiment, in step 270, the states are sorted according to an ascending order of their computed scores. In another embodiment, the states may be sorted using other sorting algorithms in accordance with their computed scores. In state 280, the states are renumbered in accordance with their sorted order. The steps performed by flowchart 200 is also shown by the following pseudo-code:

```
generate FSM transition table, TABLE, by techniques known in the art
for each state, S, in the FSM
    calculate score for state S, SCORE[S]
next S
sort states by their score
renumber the states in TABLE according to sorted order
```

Flowchart 300 includes two loops; one embedded within the other. The inside loop, which includes steps 330, 340, 350, 360 and 365, iterates through all the states of the transition table of the FSM. The outside loop, which includes steps 320, 370, 375, as well as the steps 330, 340, 350, and 360 iterates through all the input symbols received by the FSM. Steps 340 and 350 within the inner loop are used to compute the score. The algorithm carried out by flowchart 300 is also shown by the following pseudo-code:

```
    set score for state S, SCORE[S], to zero
    for each state, T, in the FSM transition TABLE
        for each symbol, B, in TABLE
            if TABLE[S][B] = TABLE[T][B] then
                set SCORE[S] = SCORE[S] + 1
            end if
        next B
    next T
```

The pseudo-code for the steps disclosed in both flowcharts 200 and 300 is provided below:

```
generate FSM transition table, TABLE, by techniques known in the art
for each state, S, in the FSM
    set score for state S, SCORE[S], to zero
    for each state, T, in the FSM transition TABLE
        for each symbol, B, in TABLE
            if TABLE[S][B] = TABLE[T][B] then
                set SCORE[S] = SCORE[S] + 1
            end if
        next B
    next T
next S
sort states by their score
renumber the states in TABLE according to sorted order
```

Figures 1A, 1B:
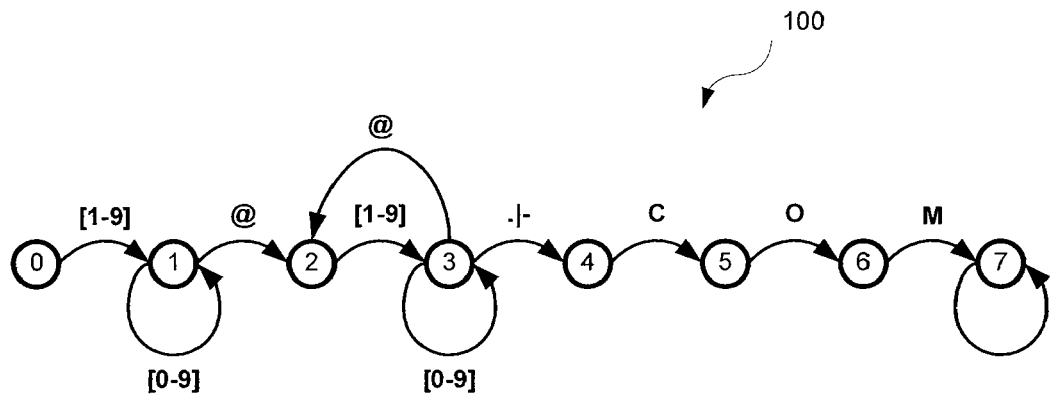
FIGS. 1A and 1B are exemplary state transition diagrams and state transition tables.
Figure 2A:
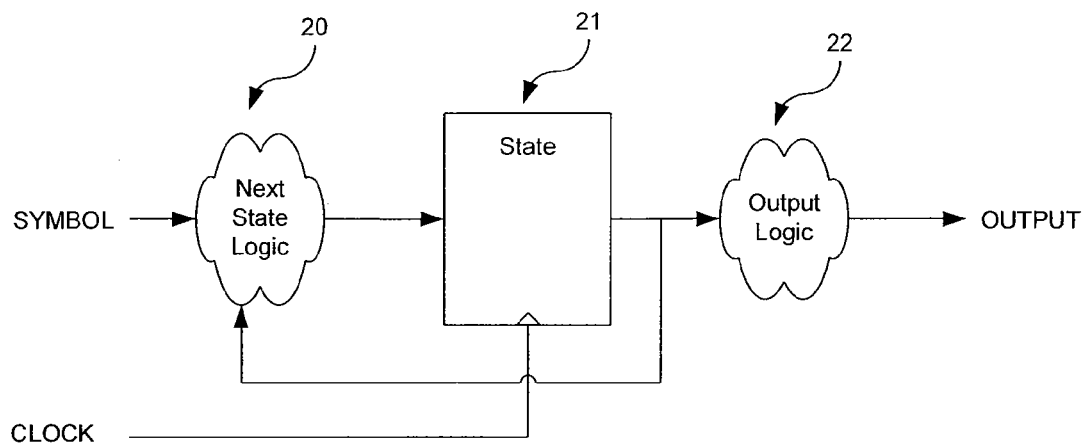
FIG. 2A is a Moore finite state machine (FSM), as known in the prior art.
Figure 2B:
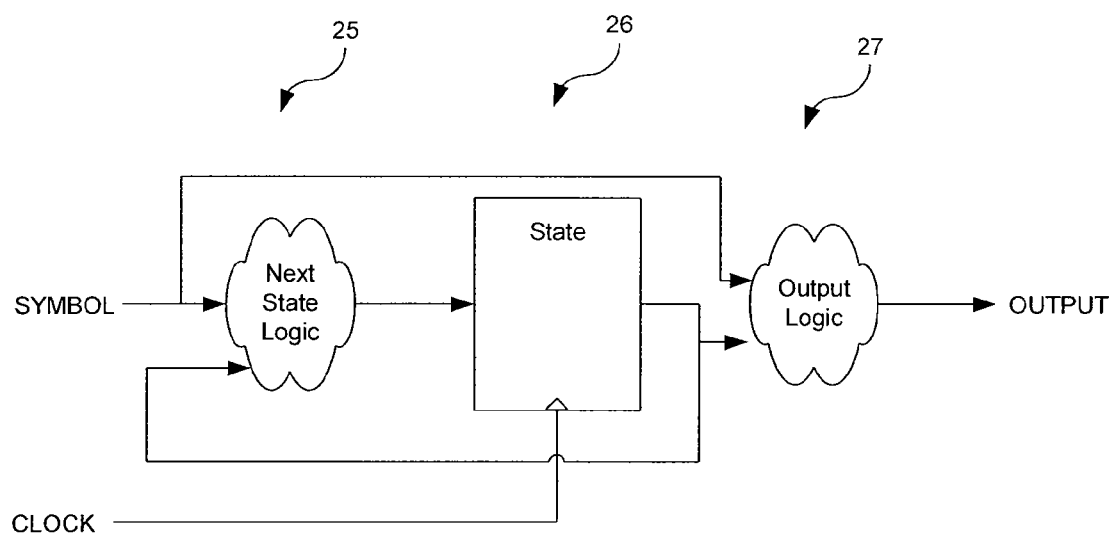
FIG. 2B is a Mealy finite state machine, as known in the prior art.
Figure 3:
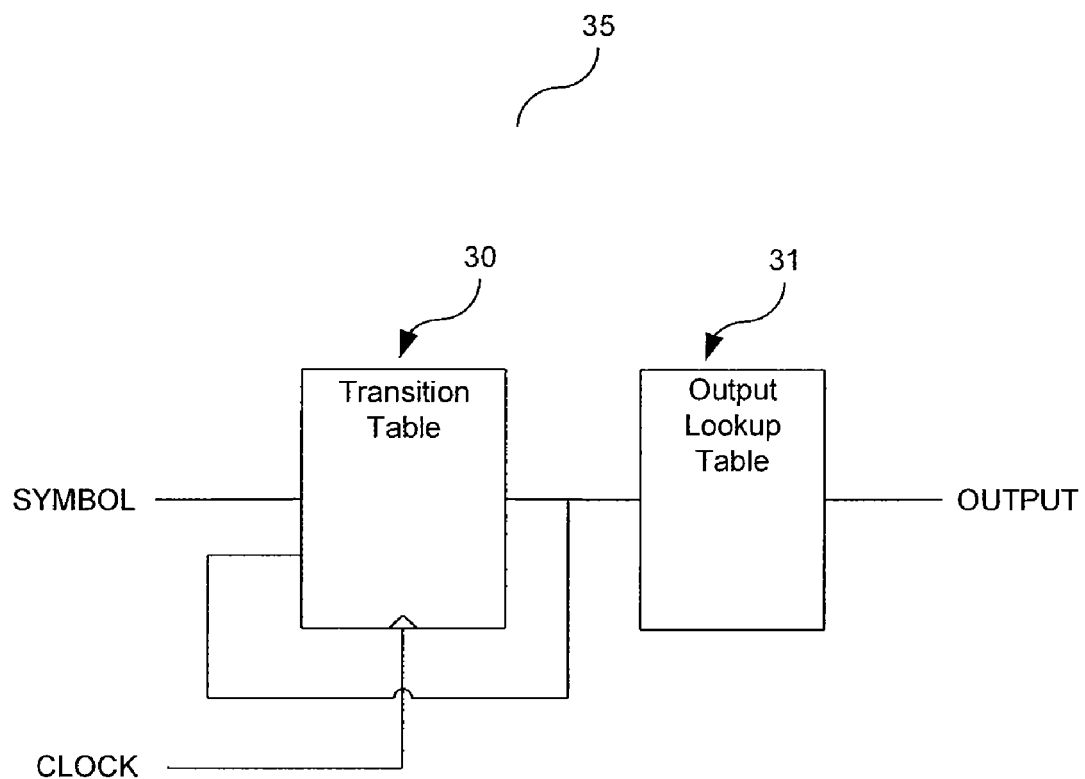
FIG. 3 is a simplified high-level block diagram of a programmable Moore FSM.

The following Figures and descriptions show state reordering, in accordance with one exemplary embodiment of the present invention. This exemplary embodiment uses the FSM transition table 110 shown in FIG. 1B, which is also shown in FIG. 6A. Computed scores for each of the states are shown in table 400 of FIG. 6B, as described further below.

Transitions from current state 0 are shown inside dashed perimeter line 405. As is seen, a transition is made from state 0 to each of states 1-9, if input symbol 1 is received; for all other input symbols the next state is the same as the current state. The score for this state, as calculated by one embodiment of the invention, is determined by examining each of the symbols in turn. The first symbol, namely symbol 0, causes a transition to state 0 from each of states 0, 2, 4, 5, and 6 (i.e., five states), as shown inside dashed perimeter line 410. Thus, since the entry in FSM transition table 110 to state 0 upon receipt of symbol 0 occurs five times in this exemplary embodiment, symbol 0 contributes a score of five to the total score for state 0, as is shown inside circle 420. In other words, to compute the score for each current state based on the received input symbol, the number of times that the input symbol causes transition to similar states is added to compute the score for that entry. For example, because there are five transitions to the next state of 1, if the input symbol 1 is received, and each of the current states 0, 1, 4, 5, and 6, transition to state 1 if they receive symbol 1, a score of 5 is computed and assigned to each of states 0, 1, 4, 5 and 6 associated with input symbol 1, as is shown inside perimeter lines 430_A and 430_B. As another example, because there are two transitions to next state 2 if input symbol @ is received, and each of states 1 and 3 transition to the next state of 2 if they receive input symbol @, a score of 2 is computed and assigned to each of the states 1 and 3 associated with symbol @, as is shown inside perimeter lines 440_A and 440_B. The scores for each of the other entries in table 110 are computed in the same manner and are shown in table 400.

Figures 7A, 7B:
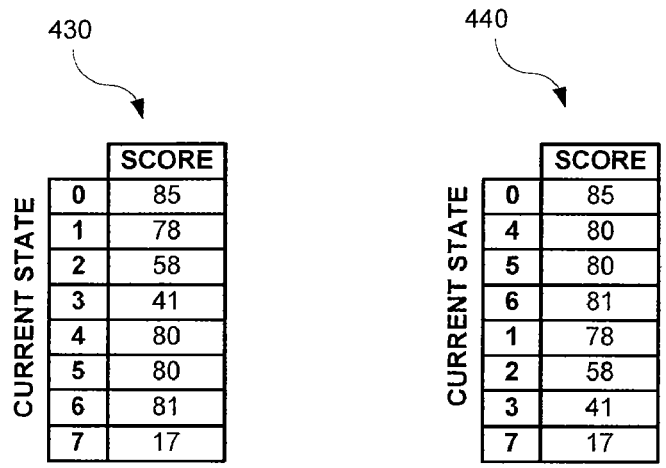
FIG. 7A shows the computed score for each current state of the state transition table of FIG. 6B, in accordance with one embodiment of the present invention.
FIG. 7B shows the current states of the state transition table after they are sorted in accordance with their compute scores, in accordance with one embodiment of the present invention.

As shown in flowcharts 200 and 300 and the above pseudo-codes, the sum of the scores in each row of table 400 is representative of the score for the current state associated with that row. In other words, the sum of the scores in, e.g., row 425 of table 400 represents the score for state 0; this sum is 85. Similarly, the sum of the scores in row 435 of table 400 represents the score for state 7; this sum is 17. Table 430 of FIG. 7A show the score so computed for each of the states 0-7 of transition table 110.

Figure 7C:
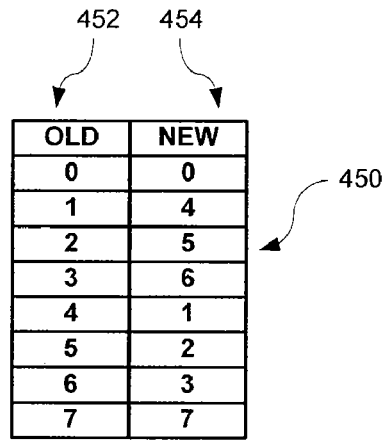
FIG. 7C shows the current states of the state transition table before and after they are reordered, in accordance with one embodiment of the present invention.

Next the states are sorted according to their scores. As seen from table 440 of FIG. 7B, in this exemplary embodiment the states are sorted in a descending order of their scores. Table 450 of FIG. 7C shows the new order of the states in its column 454 alongside the former order of the same states in its column 452. Therefore, as is seen from table 450, in accordance with the reordering, state {0, 1, 2, 3, 4, 5, 6, 7} are reordered as states {0, 4, 5, 6, 1, 2, 3, 7}.

Figure 8A:
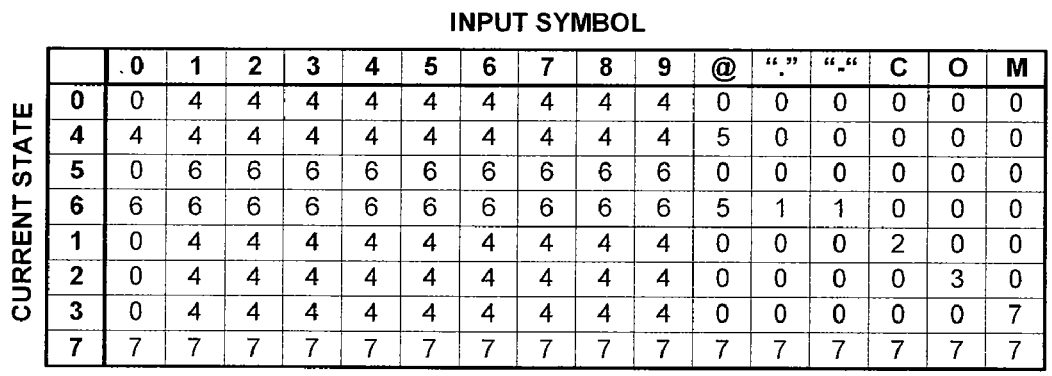
FIGS. 8A and 8B show the state transition tables and diagrams after the states are renumbered, in accordance with one embodiment of the present invention.
Figures 8B, 8C:
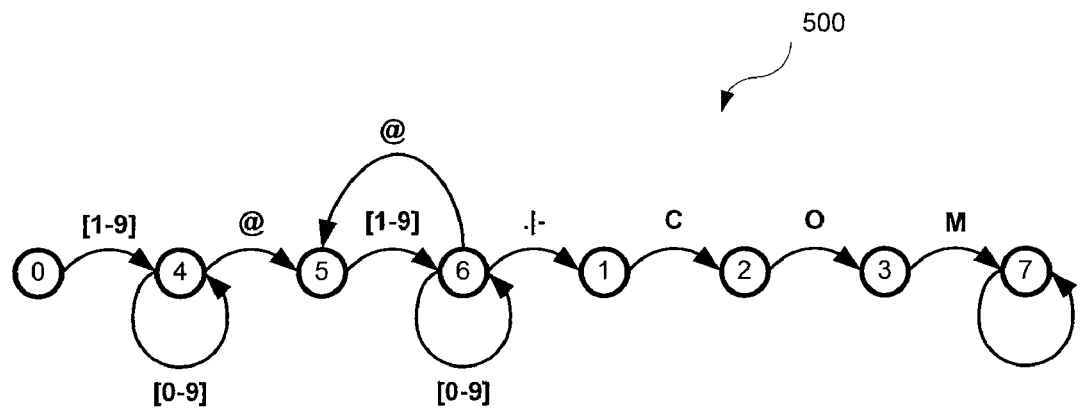
FIG. 8C shows the state transition table 8A after its current states are reordered, in accordance with one embodiment of the present invention.

Next, state transition table 460, shown in FIG. 8A, is generated in accordance with the reordered states and using transition table 110. As seen from a comparison of transition table 110 and 460, every occurrence of state 1 in table 110 is replaced with state 4 in table 460. Similarly, every occurrence of state 2 in table 110 is replaced with state 5 in table 460, etc. FIG. 8B shows a transition diagram 500 corresponding to transition table 460 of FIG. 8A. Transition diagram 500 is similar to transition diagram 100 except that the states in transition diagram 500 are reordered, in other words, states {0, 1, 2, 3, 4, 5, 6, 7} of transition diagram 100 are reordered as states {0, 4, 5, 6, 1, 2, 3, 7} in transition diagram 500. Next, the current states in transition table 460 are reordered so as to generate state transition table 8C. For example, current state 4 of transition table 460 is renumbered as current state 1 in transition table 510. Similarly, for example, current state 2 of transition table 460 is renumbered as current state 5 in transition table 510.

The present invention benefits from redundant state transitions of the FSM transition table to reduce the memory capacity required for implementing the FSM while maintaining high data throughput. By renumbering the states of the state machine, greater memory efficiencies is achieved. The state renumbering is typically performed at compile time.

Figure 9:
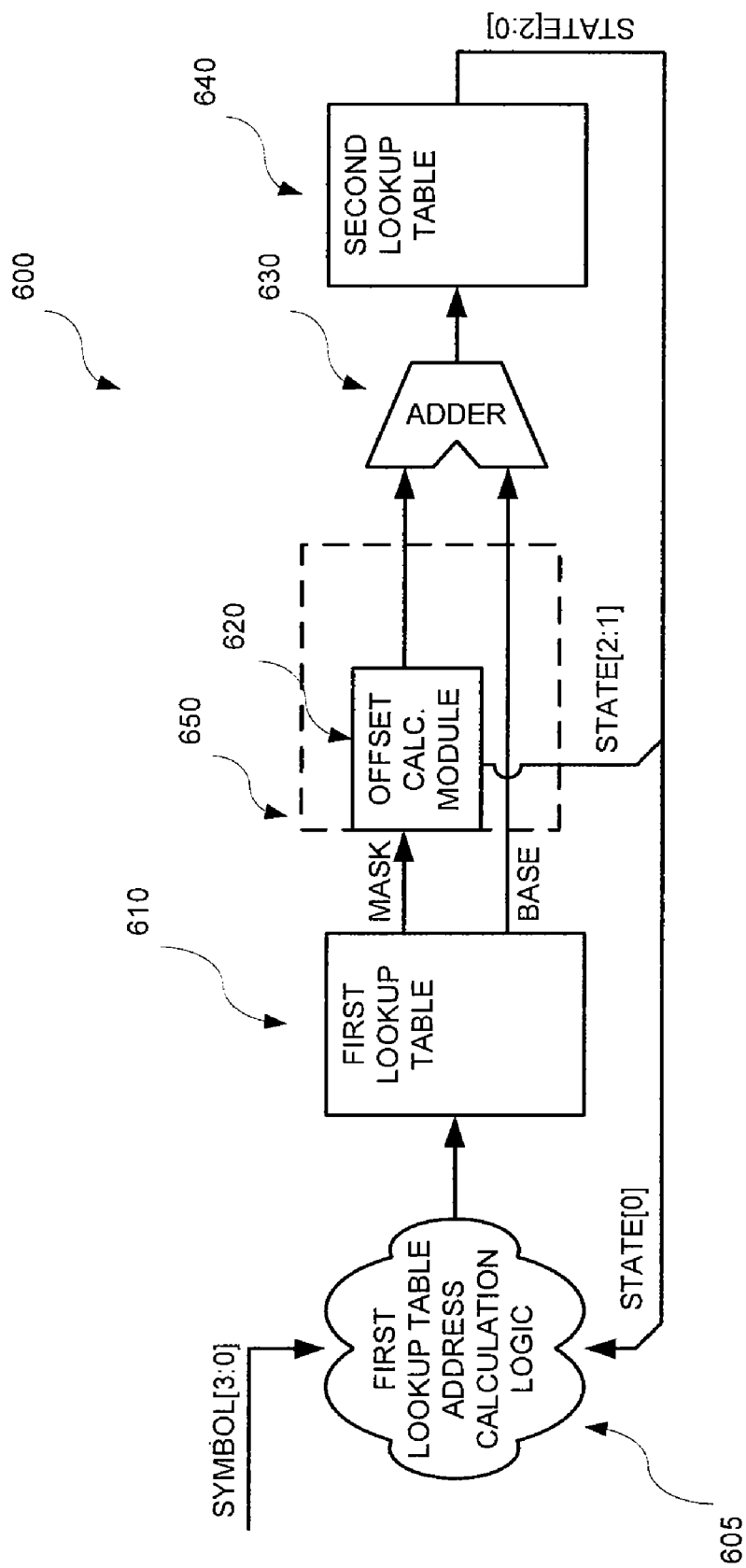
FIG. 9 is a simplified high-level block diagram of a programmable finite state machine, in accordance with one embodiment of the present invention.

FIG. 9 is a simplified high-level block diagram of a programmable finite state machine 600, in accordance with one embodiment of the present invention. The operation of programmable finite state machine 600 is described in U.S. provisional Application No. 60/473,373, filed on May 23, 2003, entitled "Apparatus And Method For Large Hardware Finite State Machine With Embedded Equivalence Classes", and U.S. application Ser. No. 10/850,978, entitled "Apparatus And Method For Large Hardware Finite State Machine With Embedded Equivalence Classes", the contents of both of which are incorporated herein by reference in their entirety.

First address calculation logic unit 605 is configured to concatenate the 3-bit of the current state with the two most significant bits of the 4-bit input symbol to form the address for the first lookup table 810. The first lookup table 610 contains a mask field and a base field for each transition block. The masks fields are supplied to offset calculation module 620, and the base fields are supplied to adder 630. Offset calculation module 620 together with adder 630 form the second address calculation logic 650. The second address calculation logic 650 uses the mask and unused bits from the input symbol, to determine a count of the number bits in the mask that are set to a logical one and appear in bit positions less than or equal to the index in the block corresponding to the input symbol in order to compute and deliver the computed address to the second lookup table 640. Second table lookup 640 retrieves and outputs the next state.

Figure 10A:
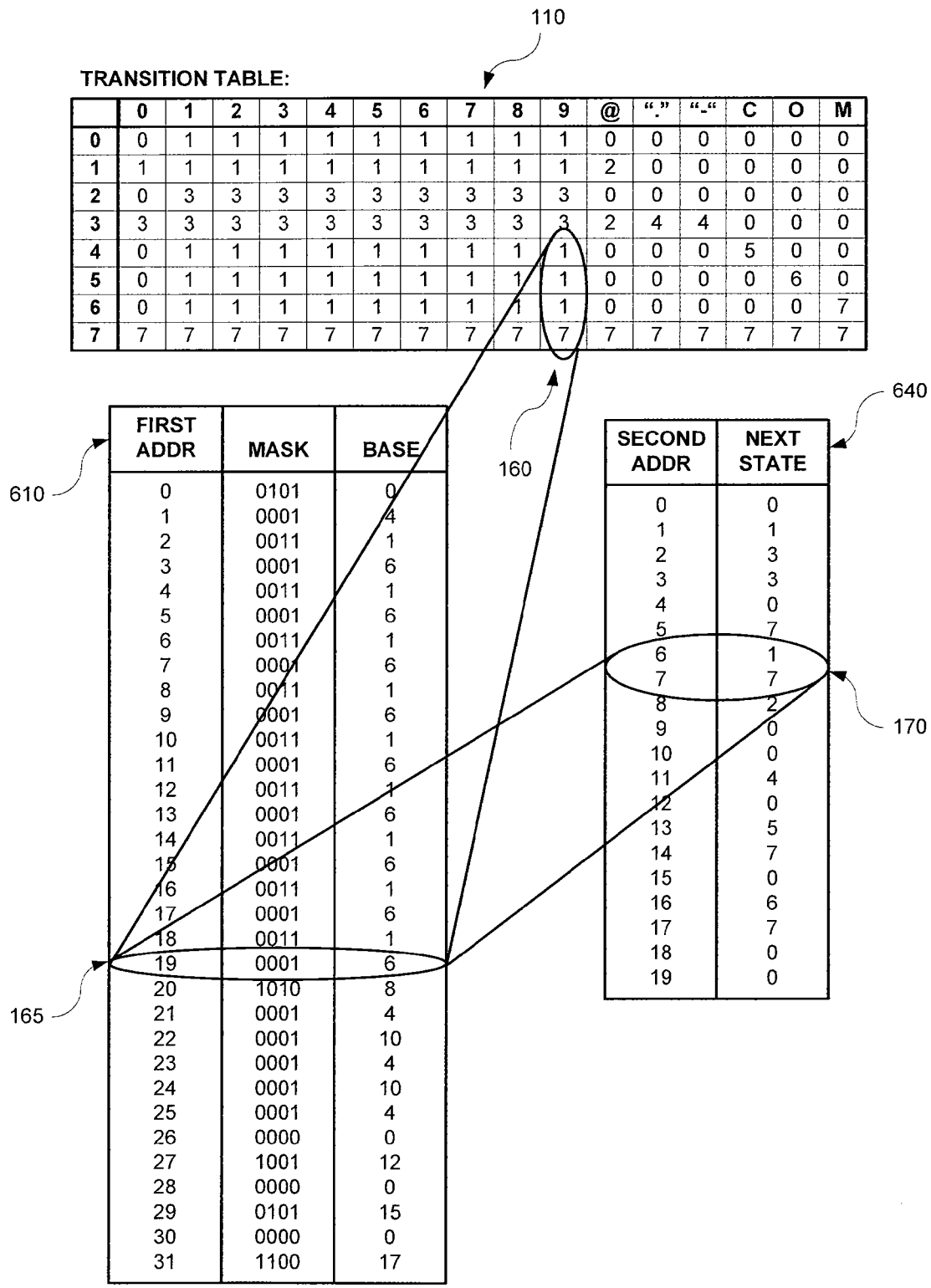
FIG. 10A shows the transition table, exemplary mask and base values stored in first lookup table, as well as corresponding next states stored in second lookup table of the programmable finite state machine of FIG. 9, when states in the transition table are not reordered.

FIG. 10A shows mask and base values stored in first lookup table 610, as well as corresponding next states stored in second lookup table 640 of FSM 600 (see FIG. 8A), for transition table 110, i.e., where no state reordering is performed. It is understood that the shown addresses for lookup tables 610 and 640 are not stored in these tables. Table 110 is partitioned along its columns, e.g., column 160, into 32 blocks each with 4 entries—that collectively represent the 128 transitions of this table. Accordingly, lookup table 610 is configured to include 32 addresses, numbered 0 through 31. Entries 165 and 170 of lookup tables 610 and 640, respectively, are associated with transition block 160 of transition table 110.

Figure 10B:
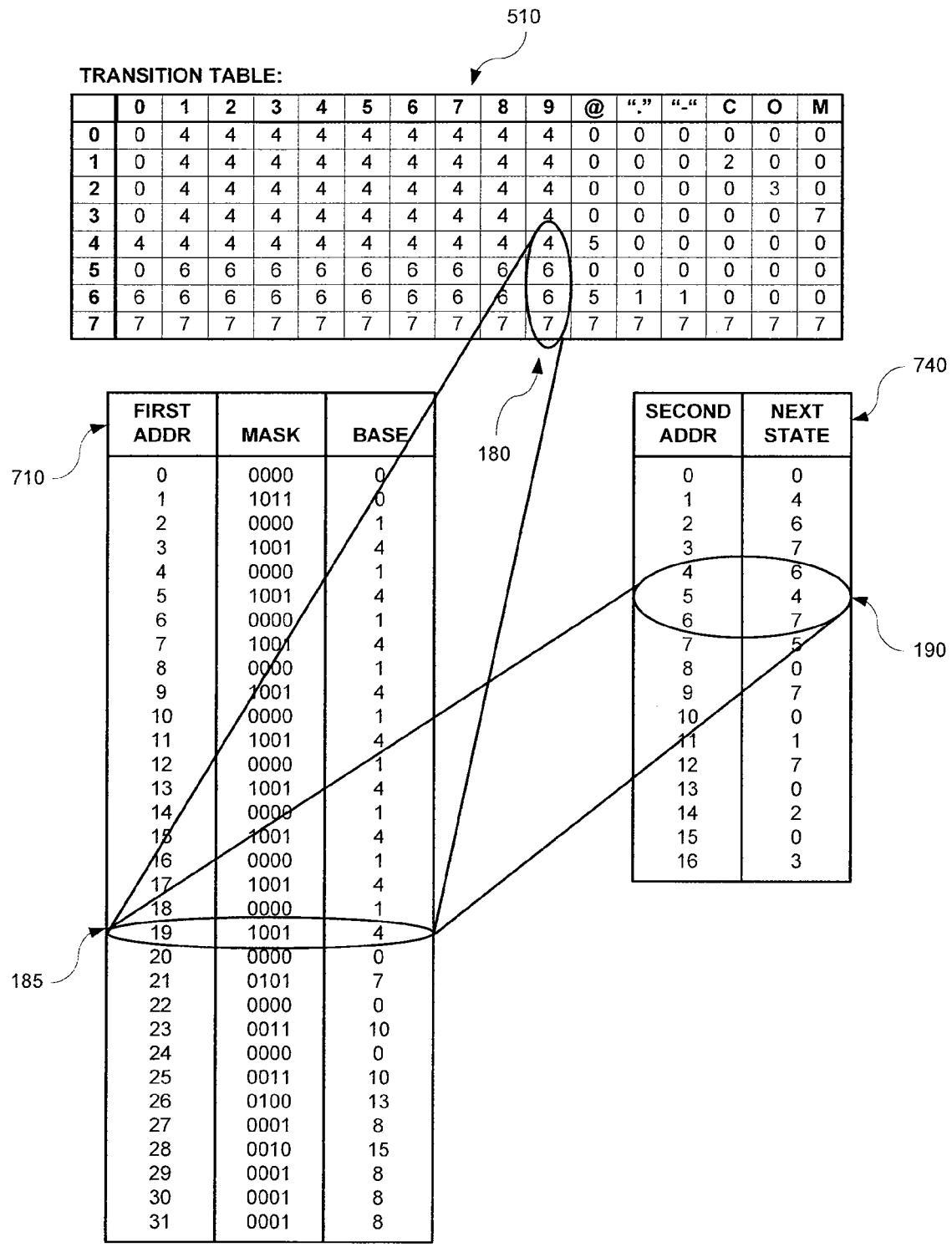
FIG. 10B shows the transition table, exemplary mask and base values stored in first lookup table, as well as corresponding next states stored in second lookup table of the programmable finite state machine of FIG. 9, after the states in the transition table are reordered, in accordance with one embodiment of the present invention.

FIG. 10B shows mask and base values stored in first lookup table 710, as well as corresponding next states stored in second lookup table 740 of FSM 600 (see FIG. 8A), for transition table 510, where state are reordered in accordance with the present invention. It is understood that the shown addresses for lookup tables 710 and 740 are not stored in these tables. Table 510 is partitioned along its columns, e.g., column 180, into 32 blocks each with 4 entries—that collectively represent the 128 transitions of this table. Accordingly, lookup table 810 is configured to include 32 addresses, numbered 0 through 31. Entries 185 and 190 of lookup tables 710 and 740, respectively, are associated with transition block 180 of transition table 510.

It is seen that the transition table 110 requires 20 storage locations, numbered 0-19, in the associated lookup table 640, whereas the reordered transition table 510 only requires 17 locations, numbered 0-16, in the associated lookup table 740. It is understood that although in these exemplary embodiments, the memory saving is about 15%, state machines with larger transition tables may achieve even greater memory efficiencies. Therefore, in accordance with the present invention, less memory is used to achieve the same functionality without changing the behavior of the FSM or sacrificing data throughput.

The above embodiments of the present invention are illustrative and not limiting. Various alternatives and equivalents are possible. The invention is not limited by the method used to compute the scores. Nor is the invention limited by the sorting algorithm used to sort and reorder the states. The invention is not limited by the type of integrated circuit in which the present invention may be disposed. Nor is the invention limited to any specific type of process technology, e.g., CMOS, Bipolar, or BICMOS that may be used to manufacture the present invention. Other additions, subtractions or modifications are obvious in view of the present invention and are intended to fall within the scope of the appended claims.

What is claimed is:

1. A method for reordering states of a transition table associated with a programmable state machine characterized by a plurality of current states and next states, the transition table having a plurality of entries defining one of the plurality of the next states to which the state machine transitions given the state machine's current state and an input symbol received by the state machine, the method comprising:
   computing a first plurality of scores each associated with a different one of the plurality of the entries in the transition table of said state machine;
   computing a second plurality of scores each associated with a different one of the current states in the transition table and in accordance with one or more of the computed first plurality of scores; and
   reordering the current states and the entries in the transition table in accordance with the computed second plurality of scores.

2. The method of claim 1 wherein the score associated with each current state is computed by summing the scores of the entries representative of the next states to which the state machine is configured to transition from that current state.

3. The method of claim 2 wherein the score associated with each entry is computed by counting the number of occurrences a transition is made to the same next state.

4. The method of claim 3 wherein the current states of the state machine are reordered in accordance with an increasing order of the second plurality of scores.

5. The method of claim 3 wherein the current states of the state machine are reordered in accordance with a decreasing order of the second plurality of scores.

6. A programmable state machine configured to operate in accordance with a transition table characterized by a plurality of current states and next states, the transition table having a plurality of entries defining one of the plurality of the next states to which the programmable state machine transitions upon being given the programmable state machine's current state and an input symbol received by the programmable state machine, wherein the current states in the transition table are reordered in accordance with a plurality of computed scores associated therewith.

* * * * *